(12) United States Patent
Kancel

(10) Patent No.: US 9,755,416 B2
(45) Date of Patent: Sep. 5, 2017

(54) INTRINSIC SAFETY BARRIER

(71) Applicant: MSA Technology, LLC, Cranberry, PA (US)

(72) Inventor: Stephen M. Kancel, Bridgeville, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 161 days.

(21) Appl. No.: 14/626,084

(22) Filed: Feb. 19, 2015

(65) Prior Publication Data

US 2016/0248241 A1 Aug. 25, 2016

(51) Int. Cl.
*H02H 1/04* (2006.01)
*H02H 9/04* (2006.01)
*H02H 9/00* (2006.01)
*H02H 9/02* (2006.01)

(52) U.S. Cl.
CPC .............. *H02H 1/04* (2013.01); *H02H 9/008* (2013.01); *H02H 9/02* (2013.01); *H02H 9/04* (2013.01); *H02H 9/043* (2013.01)

(58) Field of Classification Search
CPC ............. H01H 1/04; H02H 9/008; H02H 1/04
See application file for complete search history.

(56) References Cited

U.S. PATENT DOCUMENTS

| | | | | | |
|---|---|---|---|---|---|
| 4,412,265 | A | * | 10/1983 | Buuck | H02H 9/008 361/18 |
| 4,860,151 | A | * | 8/1989 | Hutcheon | H02H 9/008 307/326 |
| 5,144,517 | A | * | 9/1992 | Wieth | H02H 3/023 361/104 |
| 7,852,610 | B2 | * | 12/2010 | Uhlenberg | H02H 9/008 361/111 |
| 2007/0153442 | A1 | | 7/2007 | Guenter et al. | |
| 2013/0063365 | A1 | * | 3/2013 | Schmidt | G06F 3/045 345/173 |

FOREIGN PATENT DOCUMENTS

DE 19945869 A1 12/2001
EP 0 310 280 A2 4/1989

OTHER PUBLICATIONS

"5 Watt Surmetic 40 Zener Voltage Regulators"; Semiconductor Components, LLC; Nov. 2013; rev. 15; 8 pages.
"Surface Mount Schottky Power Rectifier"; Semiconductor Components, LLC; Jan. 2012; Rev. 6; 4 pages.
"Dual Transil Array for ESD Protection"; ST Microelectronics; Mar. 2000—Ed: 4A; 6 pages.
"242 Series—Hazardous Area Barrier Network Fuse"; Littelfuse printed Dec. 30, 2014; 2 pages.
"Explosive Atmospheres, Part 11: Equipment Protection by Intrinsic Safety 'i'"; BSI Standards Publication; BS EN 60079-11:2012; 149 pages.

* cited by examiner

*Primary Examiner* — Scott Bauer
(74) *Attorney, Agent, or Firm* — The Webb Law Firm

(57) ABSTRACT

An improved intrinsic safety barrier arrangement for an electrical device or component. A method of intrinsic safety barrier operation for an electrical device or component is also disclosed.

13 Claims, 2 Drawing Sheets

INTRINSIC SAFETY BARRIER

BACKGROUND OF THE INVENTION

Field of the Invention

The present invention relates to intrinsically safe limited voltage and current output barriers, located in what is known in the industry as an associated apparatus, and which are required to be installed at each electrical interface between an intrinsically safe device and another circuit located within the associated apparatus not deemed intrinsically safe so that the protective components and construction is not damaged in the intrinsically safe device while connected to the associated apparatus having intrinsically safe limited voltage and current output provided by the barrier circuit.

Description of the Related Art

One type of hazardous location is where concentrations of flammable gases, vapors, or dusts occur. Electrical equipment installed in such locations must be specially designed and tested to ensure it does not initiate an explosion, due to arcing contacts or high surface temperature of equipment.

The introduction of electrical apparatuses for signaling or lighting in coal mines was often accompanied by electrically-initiated explosions of flammable gas and dust. Accordingly, standards were developed to identify the features of electrical apparatuses that would prevent electrical initiation of explosions. Several methods of protection are used. One such method is designing electrical devices in a way so that they cannot produce a spark strong enough, or generate heat hot enough, to ignite combustible gasses and/or dusts.

Various strategies exist for safety in electrical installations in these hazardous locations. The simplest strategy is to minimize the amount of electrical equipment installed in a hazardous area, either by keeping the equipment out of the area altogether or by making the area less hazardous by process improvements or ventilation with clean air. Intrinsic safety (inclusive of non-incendive, equipment and wiring methods) is a set of practices for apparatuses designed with low power levels and low stored energy levels. In such apparatuses, insufficient energy is available under the most onerous fault conditions to produce an arc that can ignite the surrounding explosive atmosphere, and insufficient energy is available under the most onerous fault conditions to produce sufficient heat to ignite the surrounding explosive atmosphere. Intrinsic safety is one of several methods that enable a functional device to not be a source of ignition in a surrounding explosive atmosphere. A device termed intrinsically safe is designed to be incapable of producing heat or sparks sufficient to ignite an explosive atmosphere. As used herein, "intrinsically safe output" means the output of the associated apparatus is incapable of delivering a voltage and current greater than the amount of voltage and current permitted by the certification of the intrinsically safe device to be connected to the output of the associated apparatus (i.e., the output of the associated apparatus is incapable of damaging the components and construction of the intrinsically safe device).

Some considerations in designing intrinsically safe electronic devices include: limiting energies to levels not capable of producing an incendive spark in an explosive atmosphere under the most onerous fault conditions, limiting energies to levels not capable of producing the ignition of an explosive atmosphere by generated heat under the most onerous fault conditions, and incorporating the use of proper methods of spacing, construction, and materials. Elimination of spark potential within components is accomplished by limiting to within safe levels, under the most onerous fault conditions, the stored energy in any given circuit and the system as a whole. Generated heat, under certain fault conditions, such as an internal short in a semiconductor device, becomes an issue as the temperature of a component can rise to a level that can ignite some explosive gases and dusts, even in normal use. Various safeguards, such as current and power limiting by resistors and fuses, are therefore employed to ensure safety in those circumstances where a component can reach a temperature that could cause autoignition of a combustible atmosphere. In many highly compact electrical devices used today, printed circuit boards often have component spacing that make it difficult to reduce the possibility of arcing between components, with or without dust or other particulate matter working onto the circuitry. Thus component spacing, siting, and isolation techniques become important to having an intrinsically safe design.

The primary concept behind intrinsic safety is to ensure that only low voltages and currents enter the hazardous area, that no significant energy storage is possible, and that no significant heat generation is possible. A common method for protection is to limit electrical current by using multiple series resistors (assuming that resistors always fail open); and limiting the voltage with multiple Zener devices to ground (assuming diodes always fail shorted). Further, certification standards exist for intrinsic safety designs, which vary by device type, and generally require that a safety barrier, e.g., a galvanic isolation barrier, not exceed approved levels of voltage and current with specific damage to the current and voltage limiting components.

Equipment or instrumentation designed for use in a hazardous area will be designed to operate with low voltage and current, and will be designed without any large lump sum equivalent capacitances or lump sum equivalent inductances that could discharge in an incendive spark. The instrument usually will be connected, using approved wiring or connection methods, to an AC or DC electrically powered device or via one or more safety barriers all of which will be located in a non-hazardous area. The safety barrier ensures that no more than the approved voltage or current connects to the electrical interface port of the intrinsically safe device.

What is needed, and not known in the prior art, is an improved intrinsic safety barrier, typically located within an associated apparatus (like a battery charger, thus making it have an intrinsically safe output) constructed with off-the-shelf, small printed circuit board components and/or low power/current rated discrete components to provide an intrinsically safe limited current and intrinsically safe limited voltage which also has high voltage and high current electrical isolation. This improved intrinsic safety barrier can be used when connecting an AC supplied battery charger, as an associated apparatus that is connected to an intrinsically safe certified device. The improved intrinsic safety barrier prevents damaging of the protective components in the intrinsically certified device while electrically connected to the associated apparatus with intrinsically safe output.

SUMMARY OF THE INVENTION

Generally, provided is an improved intrinsic safety barrier arrangement for an electrical device or component. Preferably, provided is an improved intrinsic safety barrier that includes existing small printed circuit board components. Preferably, provided is an improved intrinsic safety barrier that includes low power/current rated discrete components.

Preferably, provided is an improved intrinsic safety barrier that provides an intrinsically safe limited current. Preferably, provided is an improved intrinsic safety barrier that provides an intrinsically safe limited voltage. Preferably, provided is an improved intrinsic safety barrier that provides high voltage and high current isolation as required by intrinsic safety standards, but with small printed circuit board components.

In one preferred and non-limiting embodiment or aspect, provided is an intrinsic safety barrier that includes x barrier circuits connected in parallel. Each barrier circuit includes: a cathode node, an output node, and a ground node. A barrier network fuse is connected between the cathode node and an input node of the intrinsic safety barrier; and y Zener diodes are connected in parallel between the cathode node of the barrier circuit and the ground node of the barrier circuit in a manner to limit a voltage to a maximum level at the cathode node. More specifically, an anode of each Zener diode is connected to the ground node of the barrier circuit and a cathode of each Zener diode is connected to the cathode node of the barrier circuit. The intrinsic safety barrier also includes z blocking diodes connected in series between the cathode node of the barrier circuit and the output node of the barrier circuit. The z blocking diodes are oriented to pass electrical current only from the cathode node of the barrier circuit to the output node of the barrier circuit. The output nodes of the x barrier circuits are coupled together to define a $VDC_{out}$ node of the intrinsic safety barrier. The ground nodes of the x barrier circuits are coupled to electrical ground. In one preferred and non-limiting embodiment or aspect, each blocking diode can be a Schottky diode.

In one preferred and non-limiting embodiment or aspect, x can be greater than or equal to 2. In one preferred and non-limiting embodiment or aspect, y can be greater than or equal to 2. In one preferred and non-limiting embodiment or aspect, z can be greater than or equal to 2.

In one preferred and non-limiting embodiment or aspect, the anode of a first of the z blocking diodes connected in series can be connected to the cathode node of the barrier circuit. A cathode of the first of the z blocking diodes connected in series can be connected to an anode of a second of the z blocking diodes connected in series. A cathode of the second of the z blocking diodes connected in series can be connected to an anode of a third of the z blocking diodes connected in series. A cathode of a final blocking diode of the z blocking diodes connected in series can be connected to the output node of the barrier circuit.

In one preferred and non-limiting embodiment or aspect, the $V_{in}$ node can be connected to an AC or a DC electrically powered device that is not configured to be intrinsically safe. The $VDC_{out}$ node is configured to be connected to an electrically powered device that is configured to be intrinsically safe or which is configured to be used and operated within a hazardous area after being disconnected from the $VDC_{out}$ node. As used herein, intrinsically safe means incapable of producing heat or a spark sufficient to ignite an explosive atmosphere.

In one preferred and non-limiting embodiment or aspect, each barrier circuit can further include a resistor in series with the z blocking diodes between the cathode node of the barrier circuit and the output node of the barrier circuit. The intrinsic safety barrier can further include m Zener diodes between the $VDC_{out}$ node and electrical ground. An anode of each of the m Zener diodes can be connected to the electrical ground. A cathode of each of the m Zener diodes can be connected to the $VDC_{out}$ node. Each of the m Zener diodes can be configured to provide transient overvoltage (Electro-Static Discharge) protection at the $VDC_{out}$ node. In one preferred and non-limiting embodiment or aspect, m can be greater than or equal to 1.

In one preferred and non-limiting embodiment or aspect, an intrinsically safe DC current ($IDC_{out}$) output from the $VDC_{out}$ node can be equal to $\Sigma_2^x I_{fuse_x}$, wherein x is a total number of barrier network fuses, and wherein $I_{fuse_x}$ is a current rating of barrier network fuse x. A maximum current ($I_{max}$) output from the $VDC_{out}$ node can be greater than or equal to 1.7 $IDC_{out}$. Each barrier network fuse can have a fusing current rating of less than 1 amp and can have an interrupt rating of greater than or equal to 1,500 amps at a $V_{in}$ voltage of 250 VAC or 354 VDC.

In another preferred and non-limiting embodiment, provided is an intrinsic safety barrier comprising a barrier circuit including: one or more Zener diodes connected in parallel between a cathode node of the barrier circuit and a ground node of the barrier circuit, an anode of each Zener diode connected to the ground node of the barrier circuit and a cathode of each Zener diode connected to the cathode node of the barrier circuit; and one or more blocking diodes connected in series between the cathode node of the barrier circuit and an output node of the barrier circuit and oriented to pass electrical current only from the cathode node of the barrier circuit to the output node of the barrier circuit. A barrier network fuse is provided having first and second ends. The first end of the barrier network fuse is coupled to the cathode node of the barrier circuit. The second end of the barrier network fuse can be coupled to an input node of the barrier circuit.

In one preferred and non-limiting embodiment or aspect, each blocking diode can be a Schottky diode. A resistor can be connected in series with the one or more blocking diodes between the cathode node and the output node of the barrier circuit. A plurality of barrier circuits can be connected in parallel, with output nodes of the plurality of barrier circuits coupled together. A plurality of barrier network fuses can be provided. The first end of each of the plurality of barrier network fuses can be coupled to the cathode node of a single one of the barrier circuits, and second ends of the plurality of barrier network fuses can be coupled together.

In one preferred and non-limiting embodiment or aspect, the second ends of the plurality of barrier network fuses coupled together can be connected to an AC or a DC electrically powered device that is not configured to be intrinsically safe. The output nodes of the plurality of barrier circuits coupled together can be connected to an electrical power consumption device, also called herein an intrinsically safe device, that is configured to be intrinsically safe, or which is configured to be used and operated within a hazardous area after being disconnected from the output nodes. As discussed, intrinsically safe means incapable of producing heat or a spark sufficient to ignite an explosive atmosphere.

In one preferred and non-limiting embodiment or aspect, at least one Zener diode can be connected between the output node and the ground node, wherein an anode of the at least one Zener diode is connected to the ground node, a cathode of the at least one Zener diode is connected to the output node. At least one Zener diode is desirably configured to provide transient overvoltage (Electro-Static Discharge) protection at the output node.

Finally, and in a further preferred and non-limiting embodiment or aspect, provided is a method of intrinsic safety barrier operation, including: (a) responsive to an AC or DC input voltage at a cathode node of the intrinsic safety barrier, establishing at the cathode node of the intrinsic safety barrier a voltage lower than the input voltage; (b) establishing at an output node of the intrinsic safety barrier a voltage that is lower than the voltage established at the cathode node of the intrinsic safety barrier; and (c) substantially concurrent with step (b), restricting current flow in a direction from the cathode node to the output node. In one preferred and non-limiting embodiment, the voltage lower than the cathode node's voltage can be established via a Zener diode.

Various preferred and non-limiting embodiments or aspects of the present invention will now be described and set forth in the following numbered clauses:

Clause 1: An intrinsic safety barrier comprising x barrier circuits connected in parallel, wherein each barrier circuit includes: a cathode node, an output node, and a ground node; a fuse connected between the cathode node and an input node of the intrinsic safety barrier; y Zener diodes connected in parallel between the cathode node of the barrier circuit and the ground node of the barrier circuit, an anode of each Zener diode connected to the ground node of the barrier circuit and a cathode of each Zener diode connected to the cathode node of the barrier circuit; and z blocking diodes connected in series between the cathode node of the barrier circuit and the output node of the barrier circuit and oriented to pass electrical current only from the cathode node of the barrier circuit to the output node of the barrier circuit, wherein: the output nodes of the x barrier circuits are coupled together to define a $VDC_{out}$ node of the intrinsic safety barrier; and the ground nodes of the x barrier circuits are coupled to electrical ground.

Clause 2: The intrinsic safety barrier of clause 1, wherein: $x \geq 2$; $y \geq 2$; and $z \geq 2$.

Clause 3: The intrinsic safety barrier of clause 1 or 2, wherein, for each barrier circuit: an anode of a first of the z blocking diodes connected in series is connected to the cathode node of the barrier circuit; a cathode of the first of the z blocking diodes connected in series is connected to supply current to an anode of a final blocking diode of the z blocking diodes connected in series; and a cathode of a final blocking diode of the z blocking diodes connected in series is connected to the output node of the barrier circuit.

Clause 4: The intrinsic safety barrier of any one of clauses 1-3, wherein: the $V_{in}$ node is configured to be connected to an AC or a DC electrically powered device that is not configured to be intrinsically safe; and the $VDC_{out}$ node is configured to be connected to an electrical power consumption device that is configured to be intrinsically safe or which is configured to be used within a hazardous area after being disconnected from the $VDC_{out}$ node, wherein intrinsically safe means incapable of producing heat or a spark sufficient to ignite an explosive atmosphere.

Clause 5: The intrinsic safety barrier of any one of clauses 1-4, wherein each barrier circuit further includes a resistor in series with the z blocking diodes between the cathode node of the barrier circuit and the output node of the barrier circuit.

Clause 6: The intrinsic safety barrier of any one of clauses 1-5, further including m Zener diodes between the $VDC_{out}$ node and electrical ground, wherein an anode of each of the m Zener diodes is connected to the electrical ground, a cathode of each of the m Zener diodes is connected to the $VDC_{out}$ node, and each of the m Zener diodes is configured to provide transient overvoltage (Electro-Static Discharge) protection at the $VDC_{out}$ node.

Clause 7: The intrinsic safety barrier of any one of clauses 1-6, wherein $m \geq 1$.

Clause 8: The intrinsic safety barrier of any one of clauses 1-7, wherein an intrinsically safe DC current ($IDC_{out}$) output from the $VDC_{out}$ node=$\Sigma_1^x I_{fuse_x}$, wherein x is a total number of barrier network fuses, and $I_{fuse_x}$ is a current rating of barrier network fuse x.

Clause 9: The intrinsic safety barrier of any one of clauses 1-8, wherein a maximum current ($I_{max}$) output from the $VDC_{out}$ node$\geq 1.7$ $IDC_{out}$.

Clause 10: The intrinsic safety barrier of any one of clauses 1-9, wherein each barrier network fuse has a fusing current rating of <1 amp and an interrupt rating of $\geq 1,500$ amps at a $V_{in}$ voltage of 250 VAC or 354 VDC.

Clause 11: The intrinsic safety barrier of any one of clauses 1-10, wherein each blocking diode is a Schottky diode.

Clause 12: An intrinsic safety barrier comprising: a barrier circuit including: one or more Zener diodes connected in parallel between a cathode node of the barrier circuit and a ground node of the barrier circuit, the anode of each Zener diode connected to the ground node of the barrier circuit and the cathode of each Zener diode connected to the cathode node of the barrier circuit; one or more blocking diodes connected in series between the cathode node of the barrier circuit and an output node of the barrier circuit and oriented to pass electrical current only from the cathode node of the barrier circuit to the output node of the barrier circuit; and a barrier network fuse having first and second ends, wherein the first end of the barrier network fuse is coupled to the cathode node of the barrier circuit.

Clause 13: The intrinsic safety barrier of clause 12, wherein each blocking diode is a Schottky diode.

Clause 14: The intrinsic safety barrier of clause 12 or 13, further including a resistor in series with the one or more blocking diodes between the cathode node and the output node of the barrier circuit.

Clause 15: The intrinsic safety barrier of any one of clauses 12-14, further comprising: a plurality of barrier circuits connected in parallel, with output nodes of the plurality of barrier circuits coupled together; and a plurality of barrier network fuses, the first end of each of the plurality of barrier network fuses coupled to the cathode node of a single one of the barrier circuits, and second ends of the plurality of barrier network fuses coupled together.

Clause 16: The intrinsic safety barrier of any one of clauses 12-15, wherein: the second ends of the plurality of barrier network fuses coupled together are connected to an AC or a DC electrically powered device that is not configured to be intrinsically safe; and the output nodes of the plurality of barrier circuits coupled together are connected to an electrical power consumption device that is configured to be intrinsically safe or which is configured to be used within a hazardous area after being disconnected from the output nodes, wherein intrinsically safe means incapable of producing heat or a spark sufficient to ignite an explosive atmosphere.

Clause 17: The intrinsic safety barrier of any one of clauses 12-16, further including at least one Zener diode between the output node and the ground node, wherein an anode of the at least one Zener diode is connected to the ground node, a cathode of the at least one Zener diode is connected to the output node.

Clause 18: The intrinsic safety barrier of any one of clauses 12-17, wherein at least one Zener diode is configured to provide transient overvoltage (Electro-Static Discharge) protection at the output node.

Clause 19: A method of intrinsic safety barrier operation, comprising: (a) responsive to an AC or DC input voltage at a cathode node of the intrinsic safety barrier, establishing at the cathode node of the intrinsic safety barrier a voltage lower than the input voltage; (b) establishing at an output node of the intrinsic safety barrier a voltage that is lower than the voltage established at the cathode node of the intrinsic safety barrier; and (c) concurrent with step (b), restricting current flow in a direction from the cathode node to the output node.

Clause 20: The method of clause 19, wherein the voltage lower than the input voltage is established via a Zener diode.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Certain preferred and non-limiting embodiments or aspects of the present invention will be described with reference to the accompanying figures.

In one preferred and non-limiting embodiment or aspect, provided is an intrinsic safety barrier for conditioning electrical power provided from an AC or DC electrically powered device that is not configured to be intrinsically safe to a DC power consumption or DC powered device that is configured to be intrinsically safe. As used herein, "intrinsically safe output" means the output of the associated apparatus is incapable of delivering voltage and current, greater than, the amount of voltage and current permitted by the certification of the intrinsically safe device to be connected at that same interface to the associated apparatus.

Figure 1:
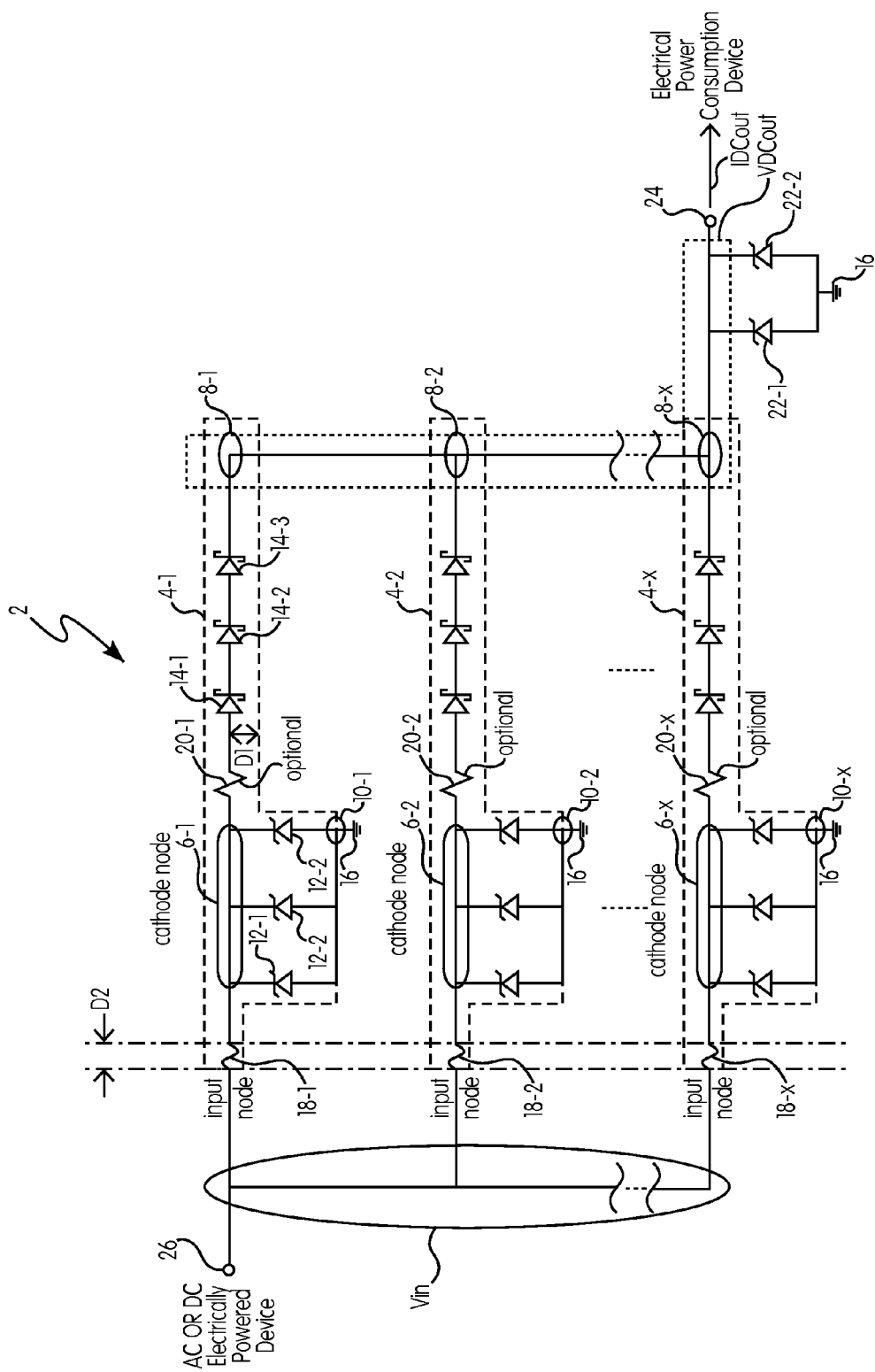
FIG. 1 is a circuit diagram of an intrinsic safety barrier, including a plurality of parallel barrier circuits, according to the principles of the present invention.

With reference to FIG. 1, an intrinsically safe barrier 2 includes x barrier circuits 4-1, 4-2 . . . 4-x. While FIG. 1 shows intrinsically safe barrier 2 having three barrier circuits 4, it is envisioned that intrinsically safe barrier 2 can have as few as two barrier circuits 4. Moreover, the maximum number of barrier circuits 4 is not limited inasmuch as the maximum number of barrier circuits 4 of intrinsic safety barrier 2 is determined by the maximum current $IDC_{out}$ to be output by intrinsically safe barrier 2 to an intrinsically safe DC power (or powered) consumption device.

In one preferred and non-limiting embodiment or aspect, each barrier circuit 4 has substantially the same circuit topology. Hence, for the purpose of simplicity, the circuit topology of barrier circuit 4-1 will be described as representative of the circuit topologies of the remaining barrier circuits, e.g., 4-2 . . . 4-x. Barrier circuit 4-1 includes a cathode node 6-1, an output node 8-1, and a ground node 10-1.

In the illustrated embodiment or aspect, three Zener diodes 12-1, 12-2, and 12-3 are connected in parallel between cathode node 6-1 and ground node 10-1. The anode of each Zener diode 12 is connected to ground node 10-1, while the cathode of each Zener diode 12 is connected to cathode node 6-1. While FIG. 1 illustrates three Zener diodes 12 it is envisioned that barrier circuit 4-1 can include as few as two Zener diodes 12. Moreover, the maximum number of Zener diodes 12 of barrier circuit 4-1 can be any number greater than two, with the actual number of Zener diodes 12 determined by the level of intrinsic safety required by the application.

In one preferred and non-limiting embodiment or aspect, connected in series directly between cathode node 6-1 and output node 8-1 of barrier circuit 4-1 are three blocking diodes 14-1, 14-2, and 14-3, which are, in one preferred and non-limiting embodiment, Schottky diodes. These blocking diodes 14 are oriented to pass electrical current only from cathode node 6-1 to output node 8-1. While FIG. 1 shows three blocking diodes 14 connected in series, it is envisioned that barrier circuit 4 can include more than three blocking diodes 14 connected in series. The actual number of blocking diodes 14 connected in series can be determined by the electrical rating of each blocking diode 14 and the desired voltage and current to be output on output node 8-1 of barrier circuit 4-1.

The output nodes 8-1, 8-2 . . . 8-x of barrier circuits 4-1, 4-2 . . . 4-x are coupled together to define a $VDC_{out}$ node of intrinsic safety barrier 2. Similarly, ground nodes 10-1, 10-2 . . . 10-x of barrier circuits 4-1, 4-2 . . . 4-x are coupled to an electrical or system ground 16 shown distributed throughout FIG. 1. It should be appreciated in FIG. 1 that each electrical or system ground 16 is coupled to the same ground potential.

Finally, intrinsic safety barrier 2 also includes barrier network fuses 18-1, 18-2 . . . 18-x. A first end of each barrier network fuse 18 is coupled to a cathode node 6 of a corresponding barrier circuit 4. Second ends of the barrier network fuses 18 are coupled together to define an input node ($V_{in}$). Via the barrier network fuses 18, the cathode nodes 6-1, 6-2 . . . 6-x of barrier circuits 4-1, 4-2 . . . 4-x are coupled together at the input node ($V_{in}$). Each barrier circuit 4 includes corresponding barrier network fuse 18.

In one preferred and non-limiting embodiment, the power rating ($P_Z$) of each Zener diode 12 of a barrier circuit 4 desirably is:

$$P_Z = (\text{fos}) \times (\text{FF}) \text{Ifuse} \times Vz_{max},$$

where fos=a predetermined factor of safety;
FF=fuse factor, which can be, for example, without limitation, ≥1.7;

$I_{fuse}$=the current rating of the barrier network fuse 18 of the barrier circuit 4; and $V_{Z_{MAX}}$=the maximum rated Zener voltage of the Zener diode 12, e.g., for a Zener diode having a Zener voltage rating ($V_Z$)=10 volts±5%, $V_{Z_{MAX}}$=10.5 volts.

As can be seen in barrier circuit 4-1, the anode of blocking diode 14-1 is connected to cathode node 6-1 and the cathode of blocking diode 14-1 is connected to the anode of blocking diode 14-2. The cathode of blocking diode 14-2 is connected to the anode of blocking diode 14-3 and the cathode of blocking diode 14-3 (or the final blocking diode of the blocking diodes in series) is connected to output node 8-1 of barrier circuit 4-1.

In use, the $V_{in}$ node is configured to be connected to an AC or DC electrical powered device that is not configured to be intrinsically safe. In other words, the AC or DC powered device is capable of producing unlimited voltage and current, under the most onerous fault conditions, capable of damaging protective components and construction in the intrinsically safe device to which it would be connected. In various embodiments, the AC or DC powered device providing power under fault conditions to the $V_{in}$ node of intrinsic safety barrier 2 can be a switched DC power supply, a single phase AC line voltage, an AC-to-DC converter, a DC-to-AC inverter, an AC or DC powered battery or instrument charging system, or any other like powered device that is not designed to be intrinsically safe and is capable of producing unlimited voltage and current, under the most onerous fault conditions, which can damage the protective components and construction in the intrinsically safe device to which it would be connected.

Each barrier circuit 4-1, 4-2 . . . 4-x can include an optional resistor 20-1, 20-2 . . . 20-x connected directly in series with the series connected blocking diodes 14 of the barrier circuit 4 between the corresponding cathode node 6 and output node 8. Each optional resistor 20 facilitates controlling the maximum current output by each barrier circuit 4, as well as tailoring the maximum voltage output by each barrier circuit 4. The value of each resistor (≥0 ohms) can be selected by one skilled in the art to meet a particular application.

Intrinsic safety barrier 2 can also optionally include one or more Zener diodes 22 between the $VDC_{out}$ node and electrical ground 16. While FIG. 1 shows two optional Zener diodes 22-1 and 22-2 the number of Zener diodes 22 can be selected based on the rating of each Zener diode and the maximum transient over-voltage protection to be provided at the $VDC_{out}$ node. In this regard, the one or more Zener diodes 22 are configured to provide transient over-voltage (Electro-Static Discharge (ESD)) protection at the $VDC_{out}$ node.

In one preferred and non-limiting embodiment or aspect, the intrinsically safe DC output current ($IDC_{out}$) output from $VDC_{out}$ node=$\Sigma_1^x I_{fuse_x}$, wherein x is the total number of barrier network fuses, and $I_{fuse_x}$ is the current rating of barrier network fuse x. Moreover, desirably, the maximum intrinsically safe current (entity parameter) ($I_{max}$) output rating from the $VDC_{out}$ node≥1.7 $IDC_{out}$. In one preferred and non-limiting embodiment or aspect, each barrier network fuse 18 desirably has a fusing rating of less than one amp and an interrupt rating of ≥1,500 amps at a $V_{in}$ voltage of 250 VAC or 354 VDC.

As can be seen, the present invention provides an intrinsically safe barrier between an AC or DC powered device at the Vin node that is not designed to have intrinsically safe output and an electrical power consumption device that is designed to be used in an environment containing an explosive atmosphere, wherein heat or sparks sufficient to ignite the explosive atmosphere cannot be tolerated, as a means whereby under the most onerous fault conditions, levels of voltage and current are not capable of damaging protective components and construction in the intrinsically safe device to which it would be connected.

With continued reference to FIG. 1, and in another preferred and non-limiting embodiment or aspect, the Zener diodes 10, optional resistor 6, and blocking diodes 20 of each of the barrier circuits 4 are separated by a minimum distance D1 from all other circuits. The cathode node 6 of each barrier circuit 4 is separated from the AC or DC powered device across the minimum spacing between the conducting contacts of its corresponding barrier network fuse 18 by a distance D2. Also, the cathode node 6 of each barrier circuit 4 is separated from the AC or DC powered device across the spacing between the cathode node 6 of each barrier circuit 4 and all other circuits by a distance D2. These distances D1 and D2 are chosen individually to provide a degree of separation around each barrier circuit 4 and its corresponding barrier network fuse 18 as required for a particular application. In one exemplary non-limiting embodiment, a 120 VAC to 250 VAC powered battery charging circuit is connected to $V_{in}$ terminal 26, and the Zener voltage ($V_Z$) of Zener diode 12 is 10.5 V. Distance D1 is 2.0 millimeters. Distance D1 is selected to be in conformance with the spacing set forth in Table 5 of standard IEC 60079-11:2011 so as not to invalidate the protection provided by barrier circuit 4 by the application of a spacing fault connecting to other DC circuits, also voltage limited to 10.5 VDC. Distance D2 is determined by the minimum spacing between the conducting contacts of barrier network fuse 18 and distance D2 is selected to be in conformance with the spacing set forth in Table 5 of standard IEC 60079-11:2011 so as not to invalidate the protection provided by barrier circuit 4 by application of a spacing fault connecting to the 120 VAC to 250 VAC powered battery charging circuit.

By way of example, and not of limitation, each Zener diode 12 is a 1N53Y7BG Zener diode, each blocking diode 14 is an MBR0520 Schottky diode, each barrier network fuse 18 is a Littelfuse 242 series barrier fuse rated at 125 milliamps and having an interrupt rating of 4,000 amps at 250 VDC. Finally, each Zener diode 22 is an ESDDA14V2L Zener diode. Since the electrical characteristic of these components is readily available, these electrical characteristics will not be described herein for the purpose of simplicity. Moreover, the listing of these particular components is exemplary and is not to be construed as limiting the invention since it is envisioned that one of ordinary skill in the art can pick and choose appropriate Zener diodes and blocking diodes in any suitable and/or desirable manner to meet a particular application.

Having thus described intrinsic safety barrier 2, the operation of intrinsic safety barrier 2 will now be described.

Figure 2:
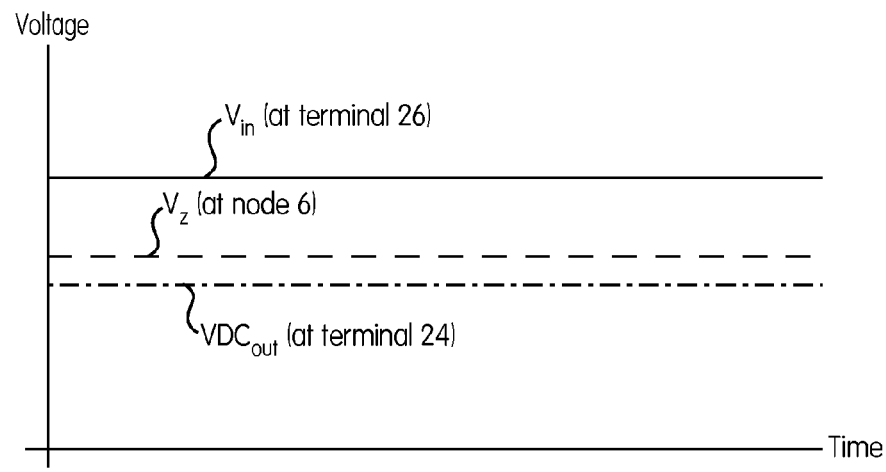
FIG. 2 is a graph of voltage versus time showing voltages at cathode and output nodes of a barrier circuit of FIG. 1 in response to the input of a DC voltage according to the principles of the present invention.

With reference to FIG. 2 and with continuing reference to FIG. 1, in response to the input of a DC voltage, either by design or by fault, at $V_{in}$ terminal 26 greater than the Zener voltage ($V_Z$) rating of the Zener diodes 12 of each barrier circuit 4, said Zener diodes 12 act to establish at cathode node 6 a voltage equal to the Zener voltage ($V_Z$) of said Zener diodes 12. In response to the Zener voltage ($V_Z$) at cathode node 6, voltage $VDC_{out}$ will appear on output node 8, with $VDC_{out}$ equal to $V_Z$ minus the voltage drops across the series connected blocking diodes 14 and, if present, resistor 20. For certification purposes, however, $VDC_{out}$ may be considered to be ($V_Z$) at cathode node 6, whereby the voltage drop between cathode node 6 and output node 8, i.e., the voltage drop across the series connected blocking diodes 14 and, if present, resistor 20, is considered to be zero volts. Because each of the parallel connected barrier circuits 4 is the same, the voltage output by the plurality of barrier circuits 4 equals $VDC_{out}$. However, because said barrier circuits are connected in parallel, the output current ($IDC_{out}$) capable of being delivered by intrinsic safety barrier 2 is the sum of the currents capable of being output by the individual barrier circuits 4 connected in parallel.

Figure 3:
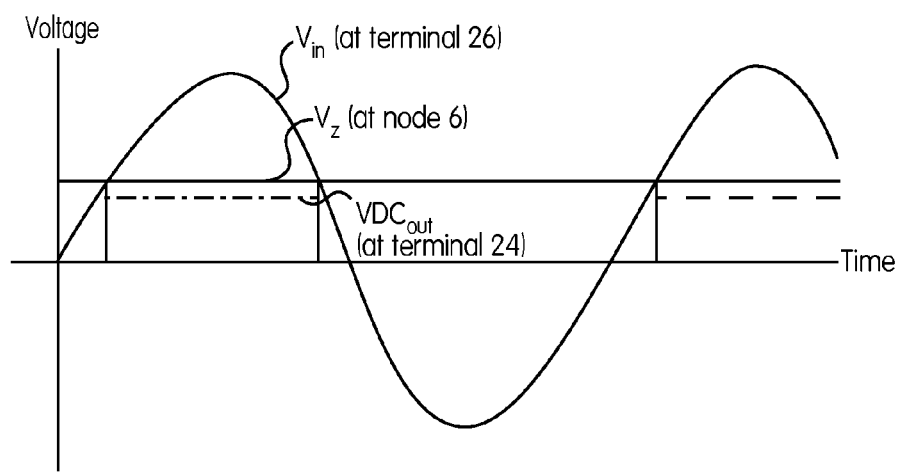
FIG. 3 is a graph of voltage versus time showing voltages at cathode and output nodes of a barrier circuit of FIG. 1 in response to the input of an AC voltage according to the principles of the present invention.

With reference to FIG. 3 and with continuing reference to FIG. 1, in response to the input of an AC voltage, either by design or by fault, at $V_{in}$ terminal 26, the Zener diodes 12 of each of the plurality of barrier circuits 4 act in a manner known in the art to half-wave rectify said incoming AC voltage. Hence, the $VDC_{out}$ voltage at $VDC_{out}$ terminal 24 equals the half-wave rectified Zener voltage ($V_z$) at cathode node 6 minus the voltage drops across the series connected blocking diodes 14 and, if provided, resistor 20 of each barrier circuit 4. Because $VDC_{out}$ at $VDC_{out}$ terminal 24 is a half-wave rectified voltage signal, the $IDC_{out}$ at $VDC_{out}$ terminal 24 is similarly a half-wave rectified current signal.

Because the plurality of barrier circuits 4 of the intrinsic safety barrier 2 are connected in parallel, the maximum output current ($IDC_{out}$) that can be delivered by intrinsic safety barrier 2 is the sum of the current capable of being output by each barrier circuit 4. Because the plurality of barrier circuits 4 are connected in parallel, the voltage output on output node 8 of each barrier circuit 4 will be the same.

Intrinsic safety barrier 2 is a solution to a technical challenge presented by the newest version of intrinsic safety standard IEC 60079-11:2011 (and other international standards based upon it), in particular, third stanza of clause 6.2.5, whereas it generally states: Protection circuitry and components may reside either in the intrinsically safe apparatus or the non-hazardous area equipment. If any part of the protection circuit is located in the non-hazardous area accessory, it shall be assessed in accordance with this standard and the non-hazardous area accessory shall be stated in the documentation.

In one preferred and non-limiting embodiment or aspect, intrinsic safety barrier 2 can be made with off-the-shelf, small printed circuit board components, and low power/current rated safety discrete components. Intrinsic safety barrier 2 achieves desired output voltage and current levels by paralleling x barrier circuits 4, where x≥2, as needed in order to provide an intrinsically safe, limited summed $IDC_{out}$ current and an intrinsically safe, limited $VDC_{out}$ voltage. The $V_{in}$ terminal 26 of intrinsic safety barrier 2 can be connected to the output connection facilities of an associated apparatus, e.g., an output of a battery charging circuit. The $VDC_{out}$ terminal 24 of intrinsic safety barrier 2 can, in turn, be connected to the input connection facilities of an intrinsically safe apparatus, e.g., rechargeable batteries inside an intrinsically safe device to be charged, located in a nonhazardous area.

One benefit of using intrinsic safety barrier 2 is the provision of a desired intrinsically safe limited voltage and a desired intrinsically safe limited current available at the connection facilities of an associated apparatus that incorporates the intrinsic safety barrier as part of its design. In particular, and in one preferred and non-limiting embodiment or aspect, each barrier circuit 4 includes a low current (<1 A) barrier network fuse 18 (constructed in accordance to clause 7.3 of IEC 60079-11:2011), which not only allows proper rating of the power of the respective Zener diodes 12 (using the $V_z$ at maximum tolerance) with a safety factor applied, but also provides the necessary electrical and mechanical segregation required by the standard if the input of intrinsic safety barrier 2 were directly connected to line voltage up to and including 250 VAC or 354 VDC (provided that intrinsic safety barrier 2 passes the power pulse test described in clause 10.8 of IEC 60079-11:2011).

In one preferred and non-limiting embodiment or aspect, and to eliminate assessing intrinsic safety barrier 2 to the condition of a fault from line voltage, a power supply certified to IEC 60950-1, 2nd Edition, 2005-12 (or similar) is desirably used as the power supply to the battery charging circuit coupled to $V_{in}$ terminal 26, whereby intrinsic safety barrier 2 is located on the charging circuit's output connection facilities.

In another preferred and non-limiting embodiment or aspect, where the power supply coupled to $V_{in}$ terminal 26 is a battery charger, any power supply (made by a manufacturer) or the combination of a power supply (made by a manufacturer) with a battery charging circuit can be used without any further evaluation to the agency intrinsic safety certification of intrinsic safety barrier 2, or the agency intrinsic safety certification of the intrinsically safe device being charged through intrinsic safety barrier 2, if the power supply is certified to IEC 60950-1, 2nd Edition, 2005-12 (or similar) and has the proper protection from line voltage hazards in accordance with IEC 60079-11:2011.

In one preferred and non-limiting embodiment or aspect, the power to each Zener diode 12 is calculated to be:

$$P = 1.7 I_{fuse} \times V_{z_{max}}, \quad \text{(Equation 1)}$$

where $V_{z_{max}}$ is the maximum rated Zener voltage of the Zener diode 12.

The temperature rating of each Zener diode 12 can be determined as:

$$TJ_{max} \geq (\text{fos} \times P \times R\theta_{JA}) + T_{amb} + 5° C., \quad \text{(Equation 2)}$$

where 5° C. is from the maximum surface temperature requirements of EN60079-0, $TJ_{max}$ is the maximum allowed junction temperature of the Zener diode as stated in its data sheet, fos is a factor of safety, e.g., 1 or 1.5 in accordance to clause 5.2 of IEC 60079-11:2011, and/or the like, P is the power to each Zener determined from Equation 1 above, $R\theta_{JA}$ is junction-to-ambient thermal resistance from the Zener diode's datasheet in degrees Kelvin (or Celsius) per Watt, and $T_{amb}$ is the maximum ambient temperature in which the Zener diode can be operating.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent units that are within the spirit and scope of the appended claims. For example, it is to be understood that the present invention contemplates that, to the extent possible, one or more features of any embodiment can be combined with one or more features of any other embodiment.

What is claimed is:

1. An intrinsic safety barrier comprising x barrier circuits connected in parallel, wherein each barrier circuit includes:
   a cathode node, an output node, and a ground node;
   a fuse connected between the cathode node and a $V_{in}$ node of the intrinsic safety barrier;

y Zener diodes connected in parallel between the cathode node of the barrier circuit and the ground node of the barrier circuit, an anode of each Zener diode connected to the ground node of the barrier circuit and a cathode of each Zener diode connected to the cathode node of the barrier circuit; and z blocking diodes connected in series between the cathode node of the barrier circuit and the output node of the barrier circuit and oriented to pass electrical current only from the cathode node of the barrier circuit to the output node of the barrier circuit, wherein:

the output nodes of the x barrier circuits are coupled together to define a $VDC_{out}$ node of the intrinsic safety barrier;

the ground nodes of the x barrier circuits are coupled to electrical ground; and the cathode nodes of the x barrier circuits are coupled together at the $V_{in}$ node of the intrinsic safety barrier.

2. The intrinsic safety barrier of claim 1, wherein:
$x \geq 2$;
$y \geq 2$; and
$z \geq 2$.

3. The intrinsic safety barrier of claim 1, wherein, for each barrier circuit:

an anode of a first of the z blocking diodes connected in series is connected to the cathode node of the barrier circuit;

a cathode of the first of the z blocking diodes connected in series is connected to supply current to an anode of a final blocking diode of the z blocking diodes connected in series; and a cathode of a final blocking diode of the z blocking diodes connected in series is connected to the output node of the barrier circuit.

4. The intrinsic safety barrier of claim 1, wherein:

the $V_{in}$ node is configured to be connected to an AC or a DC electrically powered device that is not configured to be intrinsically safe; and the $VDC_{out}$ node is configured to be connected to an electrical power consumption device that is configured to be intrinsically safe or which is configured to be used within a hazardous area after being disconnected from the $VDC_{out}$ node, wherein intrinsically safe means incapable of producing heat or a spark sufficient to ignite an explosive atmosphere.

5. The intrinsic safety barrier of claim 1, wherein each barrier circuit further includes a resistor in series with the z blocking diodes between the cathode node of the barrier circuit and the output node of the barrier circuit.

6. The intrinsic safety barrier of claim 1, further including m Zener diodes between the $VDC_{out}$ node and electrical ground, wherein an anode of each of the m Zener diodes is connected to the electrical ground, a cathode of each of the m Zener diodes is connected to the $VDC_{out}$ node, and each of the m Zener diodes is configured to provide transient overvoltage (Electro-Static Discharge) protection at the $VDC_{out}$ node.

7. The intrinsic safety barrier of claim 6, wherein $m \geq 1$.

8. The intrinsic safety barrier of claim 1, wherein an intrinsically safe DC current ($IDC_{out}$) output from the $VDC_{out}$ node$=\Sigma_1^x I_{fuse_x}$, wherein x is a total number of barrier network fuses, and $I_{fuse_x}$ is a current rating of barrier network fuse x.

9. The intrinsic safety barrier of claim 8, wherein a maximum current ($I_{max}$) output from the $VDC_{out}$ node$\geq 1.7$ $IDC_{out}$.

10. The intrinsic safety barrier of claim 1, wherein each barrier network fuse has a fusing current rating of <1 amp and an interrupt rating of $\geq 1,500$ amps at a $V_{in}$ voltage of 250 VAC or 354 VDC.

11. The intrinsic safety barrier of claim 1, wherein each blocking diode is a Schottky diode.

12. An intrinsic safety barrier comprising:

a barrier circuit including:

one or more Zener diodes connected in parallel between a cathode node of the barrier circuit and a ground node of the barrier circuit, the anode of each Zener diode connected to the ground node of the barrier circuit and the cathode of each Zener diode connected to the cathode node of the barrier circuit;

one or more blocking diodes and a resistor connected in series directly between the cathode node of the barrier circuit and an output node of the barrier circuit and oriented to pass electrical current only from the cathode node of the barrier circuit to the output node of the barrier circuit; and a barrier network fuse having first and second ends, wherein the first end of the barrier network fuse is coupled to the cathode node of the barrier circuit.

13. A method of operation of the intrinsic safety barrier of claim 12, comprising:

(a) responsive to an AC or DC input voltage at the cathode node of the intrinsic safety barrier, establishing at the cathode node of the intrinsic safety barrier a voltage lower than the input voltage;

(b) establishing at the output node of the intrinsic safety barrier a voltage that is lower than the voltage established at the cathode node of the intrinsic safety barrier; and (c) concurrent with step (b), restricting current flow in a direction from the cathode node to the output node.

* * * * *